United States Patent [19]
Canfield et al.

[11] Patent Number: 5,827,384
[45] Date of Patent: Oct. 27, 1998

[54] PROCESS FOR BONDING WEBS

[75] Inventors: David Lee Canfield, Kingsley; Michael Douglas Hill, Factoryville, both of Pa.; Stephen Joseph Lange, Wyoming; Ronald James Lynch, Cincinnati, both of Ohio; Paul Jackson Marshall, Tunkhannock, Pa.; Mark David Whaley, West Chester, Ohio

[73] Assignee: The Procter & Gamble Company, Cincinnati, Ohio

[21] Appl. No.: 896,383

[22] Filed: Jul. 18, 1997

[51] Int. Cl.[6] ....................................... B32B 31/16
[52] U.S. Cl. .................. 156/73.4; 156/73.1; 156/201; 156/204; 156/227; 156/259; 264/444
[58] Field of Search ................. 156/73.1, 73.3, 156/73.4, 157, 159, 199, 200, 201, 204, 227, 250, 258, 259, 266, 267, 580.1, 580.2; 264/442, 443, 444

[56] References Cited

U.S. PATENT DOCUMENTS

| | | | |
|---|---|---|---|
| 4,404,052 | 9/1983 | Persson et al. | 156/73.1 |
| 4,501,782 | 2/1985 | Weatherly et al. | 428/57 |
| 4,532,166 | 7/1985 | Thomsen et al. | 428/57 |
| 4,938,817 | 7/1990 | Langley | 156/73.1 |
| 4,959,109 | 9/1990 | Swain et al. | 156/73.4 |
| 5,286,542 | 2/1994 | Susi et al. | 428/58 |
| 5,460,672 | 10/1995 | Mallonee | 156/73.4 |
| 5,464,488 | 11/1995 | Servin | 156/73.4 |
| 5,582,949 | 12/1996 | Bigelow et al. | 430/132 |
| 5,628,876 | 5/1997 | Ayers et al. | 162/358.2 |
| 5,632,831 | 5/1997 | Stull | 156/73.3 |
| 5,670,230 | 9/1997 | Schlueter, Jr. et al. | 428/57 |
| 5,707,470 | 1/1998 | Rajala et al. | 156/73.2 |
| 5,713,399 | 2/1998 | Collette et al. | 139/383 AA |

OTHER PUBLICATIONS

David R. Roisum, Ph. D.; "The Mechanics of Web Spreading: Part 1"; Tappi Journal; Oct. 1993; vol. 76, No. 10; pp. 63–70.

David R. Roisum, Ph. D.; "The Mechanics of Web Spreading: Part 2"; Tappi Journal; Dec. 1993; vol. 76, No. 12; pp. 75–85.

"Web Handling Seminar"; Oklahoma Center fo Integrated Design and Manufacturing; Oklahoma State University; May 21–25, 1995; pp. 1–1 to 1–33.

R. D. Delahoussaye and J. K. Good; "Analysis of Web Spreading Induced By The Concave Roller"; Oklahoma State University, Stillwater, Oklahoma.

David R. Roisum, Ph.D.; "The Mechanics of Rollers"; Tappi Press; 1996; pp. 69–90, 215–232.

Primary Examiner—James Sells
Attorney, Agent, or Firm—Julia A. Glazer; Larry L. Huston; E. Kelly Linman

[57] ABSTRACT

An improved method for bonding webs. The method includes overlapping two webs, slitting the two webs, reoverlapping the two webs and bonding the two webs together. The steps of reoverlapping the two webs may be accomplished with a number of different types of devices including but not limited to: a bumpered roll, a notched roll, a crowned roll, a bowed roll, an out of plane roll, and variable speed rolls.

16 Claims, 6 Drawing Sheets

DOWN STREAM FLOW

DOWN STREAM FLOW

PROCESS FOR BONDING WEBS

FIELD OF THE INVENTION

This invention relates to an improved method of bonding webs.

BACKGROUND OF THE INVENTION

A number of different techniques are used for bonding webs together. One technique entails overlapping webs together near their respective edges to create an overlap and then bonding the two materials thereby forming a seam at the overlap.

U.S. Pat. No. 5,582,949 issued to Bigelow et al. on Dec. 10, 1996, teaches a process for coating the seam formed at the lap joint of an ultrasonically welded flexible belt with a film forming polymer in order to fill in irregularities in the seam.

U.S. Pat. No. 5,464,488 issued to Servin on Nov. 7, 1995, teaches a method for bonding two stationary plastic fabric layers wherein the two plastic fabrics are overlapped and ultrasonically welded together by moving an ultrasonic welding device over the area to be bonded.

U.S. Pat. No. 4,501,782 issued to Weatherly et al. on Feb. 26, 1985, teaches a method of bonding woven thermoplastic webs wherein the web is folded back on itself, overlapped and ultrasonically welded.

U.S. Pat. No. 5,286,542 issued to Susi et al. on Feb. 15, 1994 teaches a belt comprised of a porous non woven substrate wherein the belt is formed by overlapping the two ends of the belt and ultrasonically welding the two ends.

All of these teachings suffer from a common drawback wherein there is no precise means of controlling the overlap region between the two webs that are being bonded. It is difficult to form a consistent, narrow overlap of two webs due to variation in width of the webs, errors in tracking the two webs and edge imperfections.

The object of this invention is to provide a method for precisely controlling the overlap between the two areas undergoing the bonding process thereby forming a consistent, narrow overlap, minimizing the amount of overlap between the two webs being bonded together and providing a more uniform bond.

The bonding method of this invention can be used to join many different types of webs including but not limited to: diaper film materials, woven fabrics, printed curing masks, impervious packaging materials and photocopy belts.

SUMMARY OF THE INVENTION

This invention comprises a process for bonding webs which includes providing a first web having a first length, first width, first edge and a second edge. A second web is provided having a second length, second width, first edge and a second edge. The first edge of the first web is placed adjacent to the second edge of the second web so as to overlap the first edge of the first web with the second edge of the second web. The width of the overlap between the first web and second web is less than the first width of the first web and the second width of the second web.

A roll is provided with a first diameter and a second diameter wherein the first diameter of the roll is different than the second diameter of the roll. A cutting device is juxtaposed with the roll. The first web and the second web are interposed between the roll and the cutting device so as to sever the web thereby providing a severed edge of the first web and the second web respectively.

The severed edge of the first web is overlapped with the severed edge of the second web and the two webs are bonded together so as to form a bond coincident with the width of the overlap between the first web and the second web.

The invention further comprises providing a process for bonding webs wherein the two webs are overlapped and severed. The webs then may be reoverlapped by bringing the severed inboard edges of both of the webs in contact with a crowned roll, or a bowed roll, or three rolls configured in the same axial parallel plane wherein the center roll turns at a different speed than the two outer rolls.

The invention further includes bringing the overlapped webs in contact with three rolls comprising, two outer rolls and one center roll. All the rolls are parallel to the cross machine direction. The two outer rolls are disposed on a common axis. The center roll is disposed on a different axis from the two outer rolls. Preferably the center roll has a smaller diameter and width then the two outer rolls. A cutting device is juxtaposed with the center roll. The overlapped webs which are displaced as they contact the center roll are slit, reoverlapped and then bonded.

The invention also comprises providing a length of first web with a first surface, a first edge and a second edge wherein the first and second edges of the first web are parallel to the length of the first web. A length of second web is also provided having a second surface, a first edge and a second edge wherein the first and second edges of the second web are parallel to the length of the second web.

The first web is overlaid over the second web in a face to face relationship wherein the first edge of the first web contacts the second web to form a two ply thickness of the first and second web. The first web is bonded to the second web at the first edge of the first web thereby forming a bond which is juxtaposed with the first edge of the first web. The first web is separated from the second web so as to maintain the two ply thickness at the bond and a single ply thickness of the first web and the second web adjacent to the bond. The first web and second web are then bonded a second time whereby the second bond is juxtaposed with the first bond.

The invention further comprises providing a length of the first web having a first surface, a first edge and second edge wherein the first edge and second edge are parallel to the length of the first web. A second length of web is provided wherein the second web has a second surface and a first edge and a second edge wherein the first and second edges are parallel to the length of the second web.

The first web and the second web are folded about fold lines parallel to their respective first edges so as to provide a first web and a second web each having two legs of unequal length wherein one of the legs is a long leg and the other is a short leg and whereby the length of the legs is taken in a direction perpendicular to the fold. The short leg of the first web is brought into contact with the short leg of the second web in a direction perpendicular to the fold. The short leg of the first web is brought into contact with the short leg of the second web so as to dispose in a common or parallel plane the short legs of the first and second webs and at least a portion of the long legs of the first and second webs.

The first web is then bonded to the second web so as to form a bond having a principle direction generally parallel to the respective first edges. Tension is applied to both the first and second webs in a direction generally perpendicular to the fold lines thereby disposing the short legs of the first and second webs and a portion of the long legs of the first and second webs in a common plane whereby the long legs of the first and second webs are adjacent to the respective short legs of the first and second webs. The first and second webs are then bonded together a second time at the first bond in a general direction having a vector component perpendicular to the common plane of the first and second webs.

DETAILED DESCRIPTION OF THE INVENTION

Figure 2:
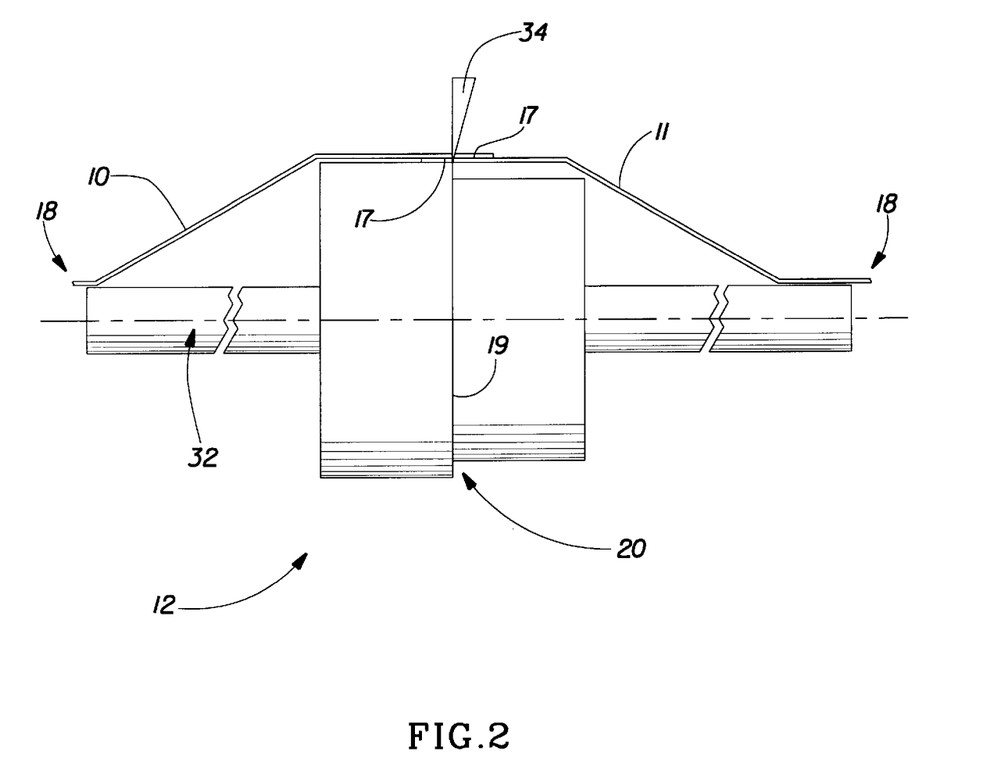
FIG. 2 is a front elevational view of a bumpered roll with the larger diameter positioned along the centerline of the roll.

The present invention is directed to a process for bonding two webs. As used herein, a web refers to any generally planar material provided in a continuous flexible form. The webs of this invention may be comprised of any type of flexible material including but not limited to: paper, plastics and metals. The two webs can be the same or dissimilar as long as they are capable of being bonded to each other. Referring to FIG. 2, the first web 10 has a first length, first width, first edge or inboard edge 17 and a second edge or outboard edge 18. The second web 11 has a second length, second width, first edge or inboard edge 17 and a second edge or outboard edge 18. The inboard edge 17 of each web is oriented toward and juxtaposed with the inboard edge 17 of the other web. The outboard edge 18 of each web is oriented away from the respective inboard edge 17 of each web.

Figure 1:
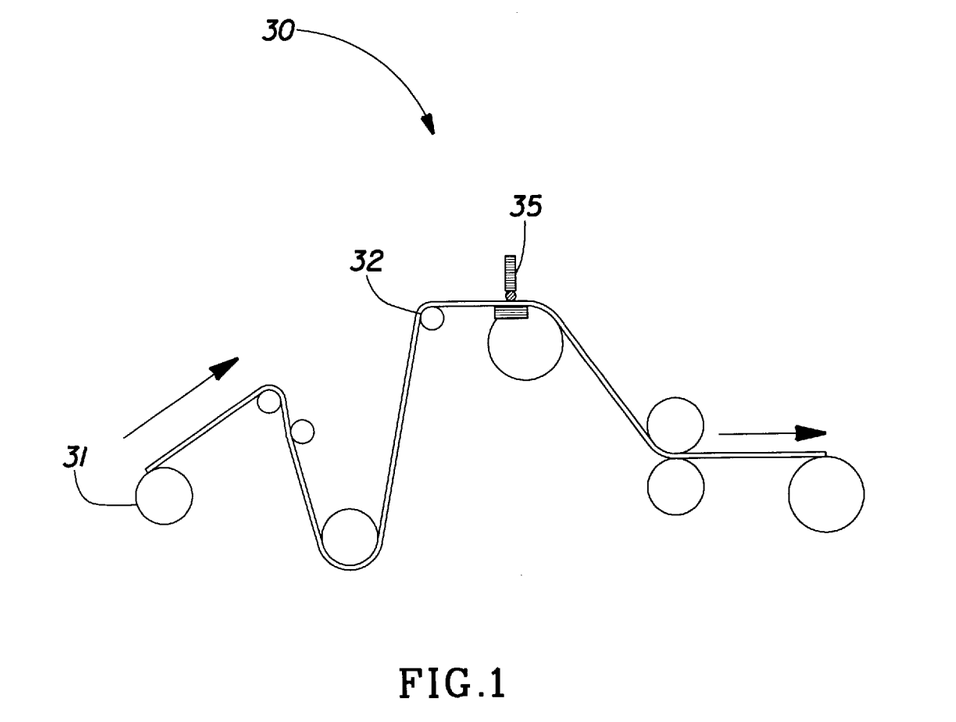
FIG. 1 is a schematic side elevational view of a web handling apparatus.
Figure 3:
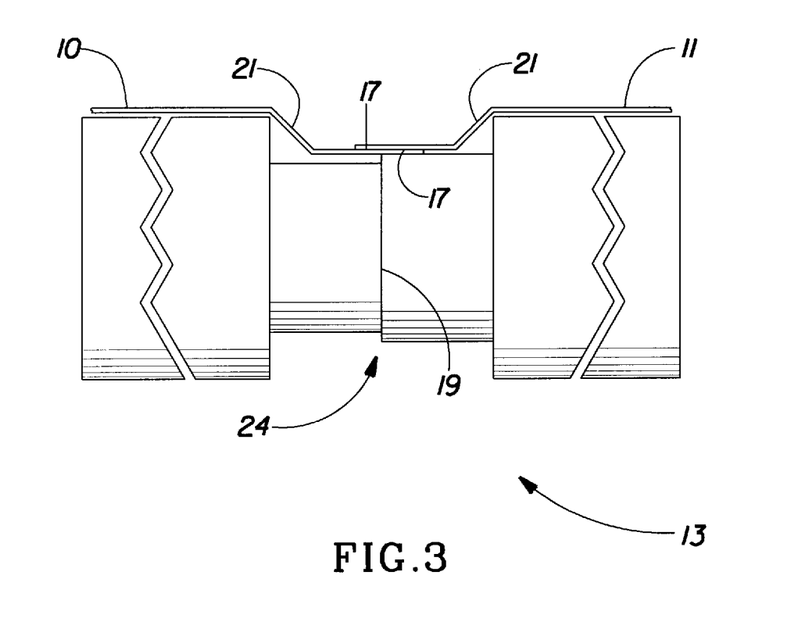
FIG. 3 is a front elevational view of a notched roll with the smaller diameter positioned along the centerline of the roll.

Referring to FIG. 1, FIG. 2 and FIG. 3, there are four basic steps in the process for bonding two webs including but not limited to: overlapping the webs 10, 11, slitting the webs 10, 11, reoverlapping the webs 10, 11 and bonding the webs 10, 11 at a bonding station 35. Optionally, a trim removal step may be included after slitting the webs 10, 11. Additionally, in the case of bumpered rolls 12, notched rolls 13 and out of plane rolls 21 (each of which is discussed more fully below), the four basic steps above will also include a retraction step after the webs 10, 11 are slit.

The process of the present invention may be carried out on a web handling apparatus 30 such as the one schematically depicted in FIG. 1. A preferred web handling apparatus 30 for carrying out the present invention is manufactured by Webex Incorporated of Neenah, Wis. The web handling apparatus 30 of this invention includes but is not limited to unwind stands 31 for unwinding the webs, tracking rolls, intermediate rolls, a cutting device such as a slitter 34, and a bonding station 35 for bonding the two webs 10, 11 together and optionally a rewinder.

As the two webs 10, 11 are unwound, the inboard edge 17 of the first web 10 is overlapped with the inboard edge 17 of the second web 11. According to embodiments of this invention shown in FIGS. 2, 3, and 4 during the web handling process, at least one of the two overlapped webs 10, 11 are displaced out of plane. Displacement of at least one of the webs 10, 11 causes the overlapped inboard edge 17 of both the first web 10 and the second web 11 to retract away from each other in the cross machine direction. After the webs 10, 11 are displaced, the webs 10, 11 are slit by a cutting device so as to form two discrete severed inboard edges 17 of the first web 10 and the second web 11 respectively each of which are in alignment with one another. As the two webs 10, 11 are returned to a planar condition, a precise new overlap of the two severed inboard edge 17 occurs. The first web 10 is then bonded to the second web 11 coincident with the new overlap 16.

Different devices useful for retracting the webs 10, 11 include but are not limited to: three rolls in parallel with the center 23 roll placed in a different plane relative to the outer 22 rolls, a notched roll 13, or preferably a bumpered roll 12.

Referring to the preferred embodiment of this invention in FIG. 2, a bumpered roll 12 will have a raised area 20 comprising a larger diameter and at least one smaller diameter located outboard 18 of the raised area 20. At least one of the two webs 10, 11 contacts the raised area 20. Preferably the raised area 20 is juxtaposed with and extends beyond both sides of the bumpered roll 12 centerline 19. Most preferably the raised area 20 will be comprised of two different diameters, each diameter being larger than the balance of the roll.

Though there are numerous different means of forming a bumpered roll 12, one preferred means entails wrapping a strip of flexible material around the circumference of a single diameter roll coincident with the centerline 19 of the single diameter roll so as to produce a larger diameter at this location. The increased diameter may also be accomplished by machining the roll or by using an annular ring held in place with shrink fit. Alternatively, there are other means to accomplished this which would be familiar to one skilled in the art. The bumpered roll 12 may be driven at the same rotational speed or a different rotational speed as that of the other driven rolls in the web handling apparatus 30. Conversely, the bumpered roll 12 could be stationary. The bumpered roll 12 may be used as an anvil roll 32 for the cutting device.

Referring to FIG. 3, a notched roll 13 can also be utilized in place of the bumpered roll to displace out of plane the overlapped inboard edge 17 of two webs 10, 11. As the converse of a bumpered roll 12, a notched roll 13 has at least one area of reduced diameter wherein at least one of the two webs 10, 11 contacts this area. Preferably the area of reduced diameter 24 is juxtaposed with and extends beyond both sides of the notched roll 13 centerline 19. More preferably the area of reduced diameter 24 will be comprised of two different diameters. A notched roll 13 may be formed in any number of ways which will be familiar to one skilled in the art.

Referring to FIGS. 2 and 3, the bumpers of a bumpered roll 12 and the notches 13 of a notched roll need not be coincident with the centerline 19 of the roll. The bumpers and notches may be offset from the longitudinal centerline 19 of the roll. In any such configuration, it is only necessary that at least one of the webs 10,11 and preferably both of the webs 10,11 contact the notch or bumper.

Figure 4:
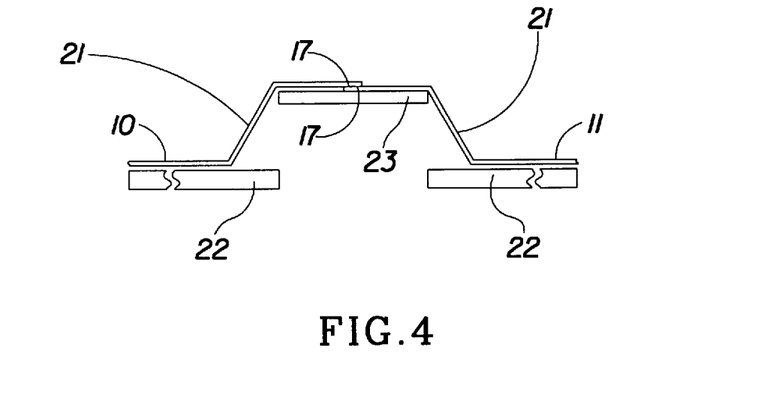
FIG. 4 is a front elevational view of three rolls in parallel with the center most roll positioned in a plane different than that of the outer two rolls.

FIG. 4 illustrates another embodiment of this invention wherein the overlapped inboard edges 17 of the two webs 10, 11 are displaced out of plane 21. For this embodiment, three rolls are placed in parallel in the cross machine direction. The two outer 22 rolls are disposed in a common axis. The center roll 23 is placed at a different elevation relative to the two outer rolls 22. The center roll will also preferably be a smaller width and diameter then the two outer rolls 22. The inboard edge 17 of the first web 10 and the inboard edge 17 of the second web 11 will contact the center roll 23 resulting in the out of plane 21 displacement of these inboard edges 17.

Yet another means of displacing the overlapped inboard edges 17 of the two webs 10, 11, not shown, entails inducing a wave or trough into at least one of the two webs 10, 11 prior to slitting. The wave or trough would then be removed after slitting, thereby resulting in the overlap 16 of the severed inboard edge 17 of the first web 10 with the severed inboard edge 17 of the second web 11. Ring rolls, as are commonly known in the art, can be used for this purpose.

Figure 5:
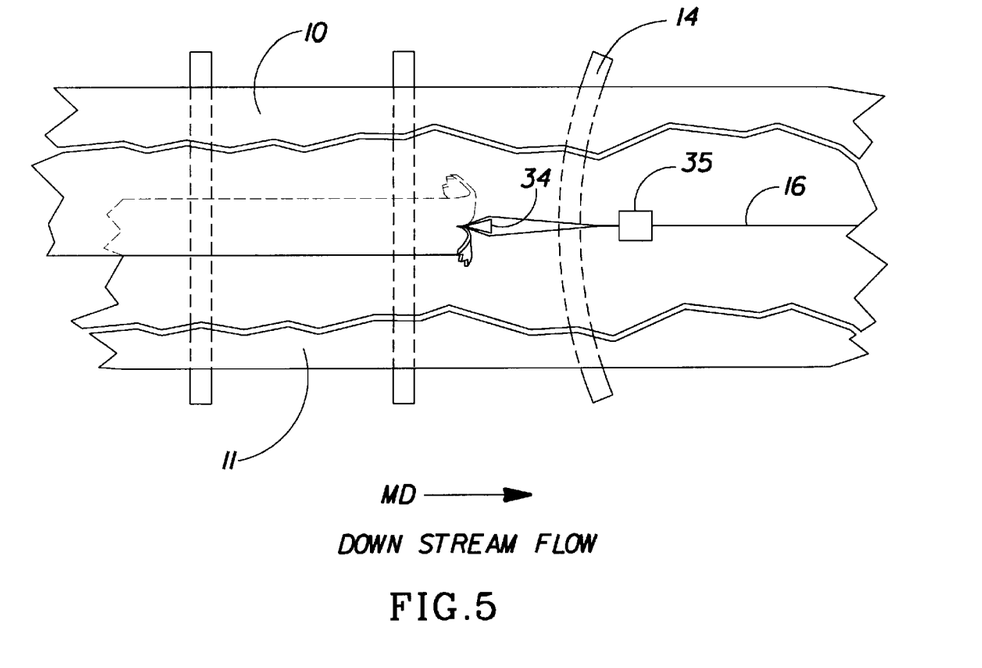
FIG. 5 is a schematic top plan view of a web handling apparatus including a bowed roll.
Figure 6:
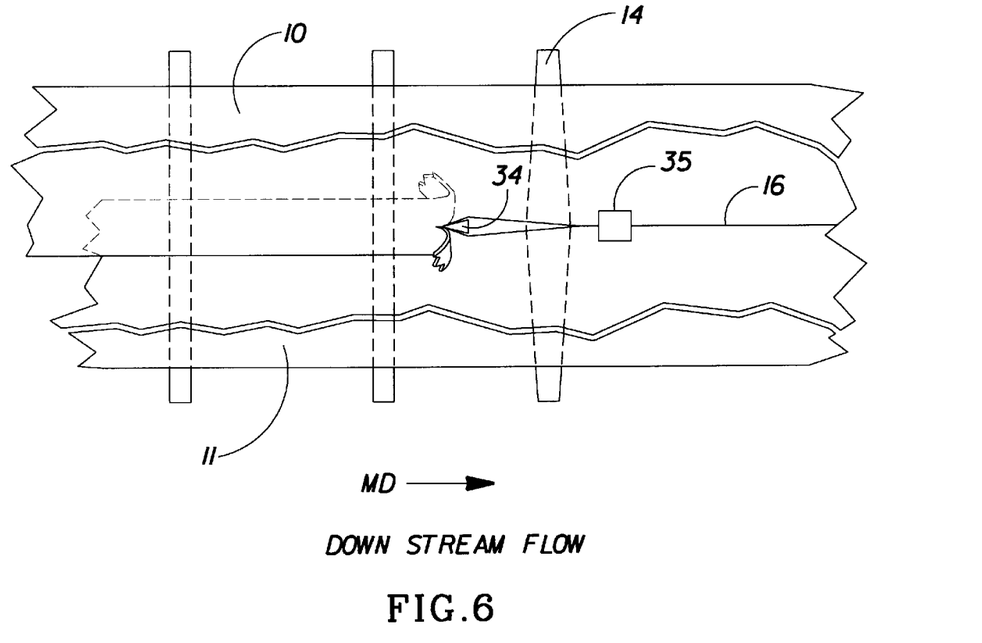
FIG. 6 is a schematic top plan view of a web handling apparatus including a crowned roll.

Another means of overlapping the inboard edge 17 of the two webs 10, 11 according to this invention is shown in FIGS. 5 and 6. Prophetically, either a bowed roll 14 as shown in FIG. 5 or a crowned roll 15 as shown in FIG. 6 may be used to form a new overlap 16 after the webs 10, 11 have been slit. Referring to FIG. 5, a bowed roll 14, well known in the art, is an axially rotatable roll having a radius of curvature. A bowed roll 14 is generally used to spread a web. For a process that flows from upstream to downstream, the bow of the roll when used to spread a web will be oriented convex to the downstream. According to the Normal Entry Law, a well-known principle of web handling, a web will generally enter a downstream roll at a right angle to the roll's axis at the point of first contact. In the case of a bowed roll 14, the web will contact the bowed roll 14 perpendicular to the radius of curvature of the bowed roll's 14 axis.

By reversing the traditional configuration of a bowed roll 14 so that the bow is oriented concave to the downstream as shown in FIG. 5, a bowed roll 14 or any other web spreading device may be used in this invention as a means of overlapping the inboard edge 17 of the first web 10 with the inboard edge 17 of the second web 11 after the webs 10, 11 have been slit. Applying the Normal Entry Law principle, as long as both of the webs 10, 11 are in traction with the surface of the roll, the severed inboard edge 17 of the first web 10 and second web 11 respectively, will form an overlap 16 as the first web 10 and second web 11 approach the bowed roll 14. One skilled in the art will recognize that other web spreading devices can also be used in a reverse configuration to facilitate overlapping the first web 10 and second web 11 inboard edge 17.

Referring to FIG. 6, a crowned roll 15, well known in the art, is a barrel shaped roll which can be used in this invention to overlap 16 the inboard edge 17 of the first web 10 with the inboard edge 17 of the second web 11 after the webs 10, 11 have been slit. The diameter of the crowned roll 15 is typically greatest at the centerline 19 of the roll. The roll tapers to a smaller diameter in the roll's axial direction away from the longitudinal centerline 19. Applying the Normal Entry Law principle, the severed inboard edge 17 of the first web 10 and second web 11 will form an overlap 16 as the first web 10 and second web 11 approach the crowned roll 15.

Yet another means (not shown) of overlapping the inboard edge 17 of the first web 10 with the inboard edge 17 of the second web 11 after slitting is accomplished by placing three rolls end to end in parallel in the cross machine direction. The three rolls are all positioned in the same plane relative to one another. The two outer rolls 22 rotate at the same speed while the center roll 23 rotates at a faster speed relative to the two outer rolls 22. The outboard edge 18 of the first web 10 contacts one outer 22 roll while the outboard edge 18 of the second web 11 contacts the other outer 22 roll. Concurrently, the severed inboard edge 17 of the first 10 and second web 11 contact the center roll 23. The faster rotation of the center roll 23 relative to the two outer rolls 22 will force the severed inboard edge 17 of the first 10 and second web 11 to overlap 16.

The webs 10, 11 may be bonded together in any number of ways including but not limited to adhesively bonding or ultrasonically bonding. Adhesives which may be used for adhesively bonding webs 10, 11 include but are not limited to hot melt adhesives available from H. B. Fuller Company of St. Paul, Minn. and ATO Findley Adhesives Corporation of Wauwatosa, Wis. Ultrasonic bonding is the preferred method for bonding thermoplastic webs 10, 11 such as films. A preferred ultrasonic welding device, available from Branson Ultrasonic Corporation of Danbury, Conn., is comprised of a power supply—model number 910 BCA; a converter—model number 902 R; a booster—model number 900 Sld; and a carbide face slitter 34 horn—part number 109-121-012 1/2.

The bonding pattern used to bond the two webs 10, 11 together may include but is not limited to: a continuous uniform or non uniform pattern, a semicontinuous uniform or non uniform pattern or a discrete uniform or non uniform pattern. Continuous and discrete patterns are well known in the art. Semicontinuous patterns are illustrated in commonly assigned U.S. Pat. No. 5,628,876 issued to Ayers et al. on May 13, 1997, the disclosure of which is incorporated by reference for purposes of illustrating semicontinous patterns.

Figure 7A:
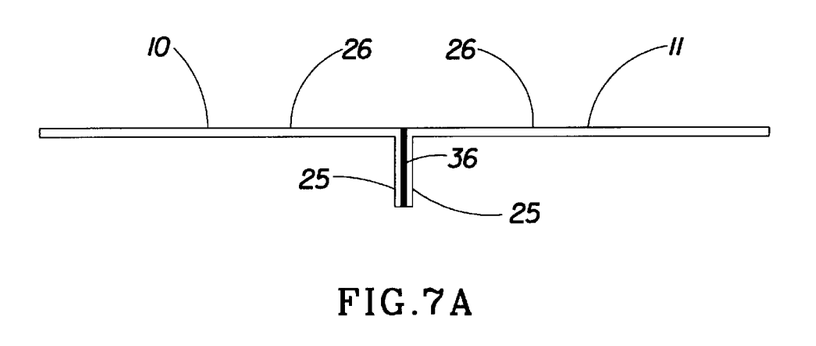
FIG. 7A is a front elevational view of a second embodiment of the web configuration during the first bonding process.
Figure 7B:
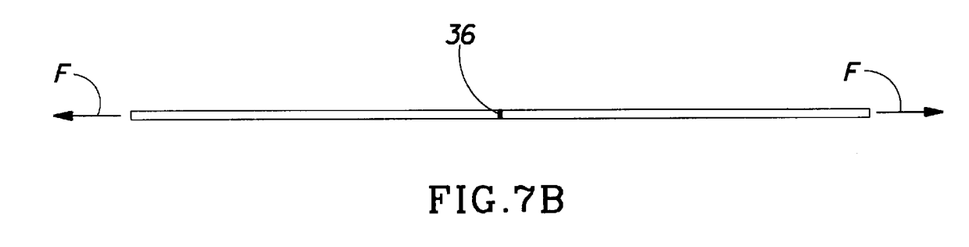
FIG. 7B is a front elevational view of the web of 7A just after the first bonding process.
Figure 7C:
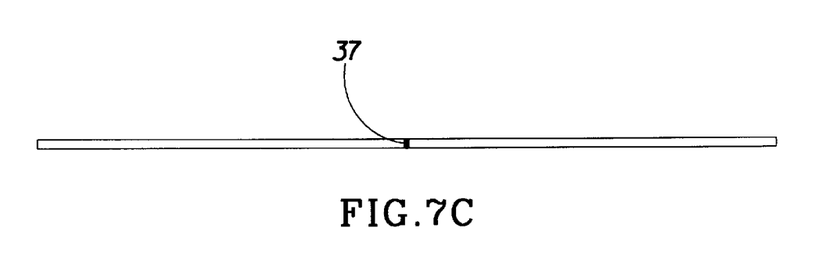
FIG. 7C is a front elevational view of the web of 7A during the second bonding process.

Referring to FIG. 7A, FIGS. 7B and 7C in order to bond the two webs 10, 11 of this invention together, preferably the first web 10 and the second web 11 are folded about fold lines parallel to their respective first edges so as to provide a first web 10 and a second web 11 each having two legs preferably of unequal length wherein one of the legs is a long leg 26 and the other is a short leg 25. The length of the legs is taken in a direction perpendicular to the fold. The short leg 25 of the first web 10 is brought into contact with the short leg 25 of the second web 11 in a direction perpendicular to the fold so that the cross machine direction width of the short legs 25 is perpendicular to the fold. The short leg 25 of the first web 10 is brought into contact with the short leg 25 of the second web 11 so as to dispose in a common or parallel plane the short legs 25 of the first 10 and second webs 10, 11. At least a portion of each of the long legs 26 of the first 10 and second webs 11 are disposed in a common plane and extend away from the fold line.

The first web 10 is then bonded to the second web 11 at the short legs 25 so as to form a bond 36 having a principal direction generally parallel to the respective first edges. Tension is applied to both the first 10 and second webs 11 in a direction generally perpendicular to the fold lines thereby disposing the short legs 25 of the first 10 and second webs 11 and a portion of the long legs 26 of the first 10 and second webs 11 in a common plane whereby the long legs 26 of the first 10 and second webs 11 are adjacent to the respective short legs 25 of the first 10 and second webs 11. The first 10 and second webs 11 are then bonded together a second time at the first bond 36. The second bond 36 is applied in a general direction having a vector component perpendicular to the common plane of the first 10 and second webs 11.

Figure 8A:
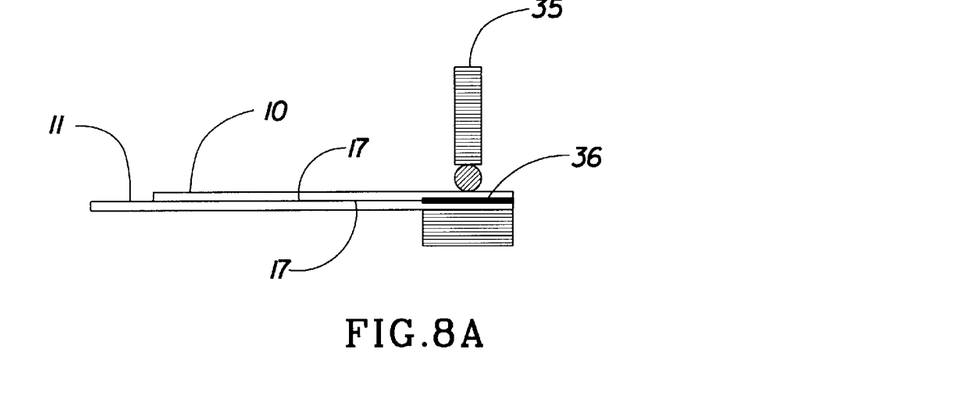
FIG. 8A is a front elevational view of a third embodiment of the web configuration during the first bonding process.
Figure 8B:
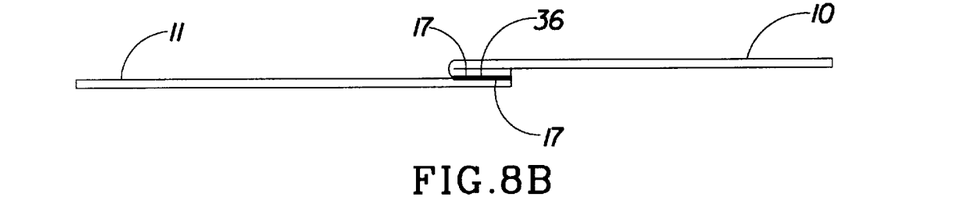
FIG. 8B is a front elevational view of the web of 8A just after the first bonding process.
Figure 8C:
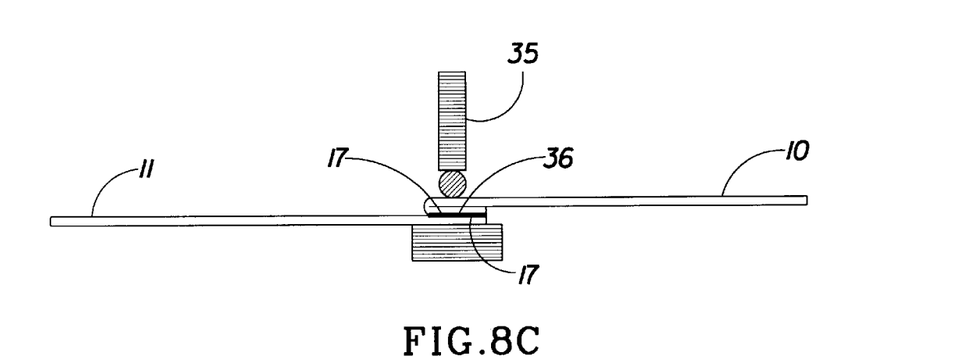
FIG. 8C is a front elevational view of the web of 8A during the second bonding process.

Referring to FIG. 8A, FIGS. 8B and 8C a more preferable method for bonding the first web 10 to the second web 11 is accomplished by overlaying the first web 10 over the second web 11 in a face to face relationship wherein the inboard edge 17 of the first web 10 contacts the inboard edge 17 of the second web 11 to form a two ply thickness of the first 10 and second web 11. The first web 10 is bonded to the second web 11 at the inboard edge 17 of the first web 10 thereby forming a bond 36 which is juxtaposed with the inboard edge 17 of the first web 10. The first web 10 is separated from the second web 11 so as to maintain the two ply thickness at the bond 36 and a single ply thickness of the first web 10 and the second web 11 adjacent to the bond 36. The first web 10 and second web 11 are then bonded a second time whereby the second bond 36 is juxtaposed with the first bond 36.

Figure 9:
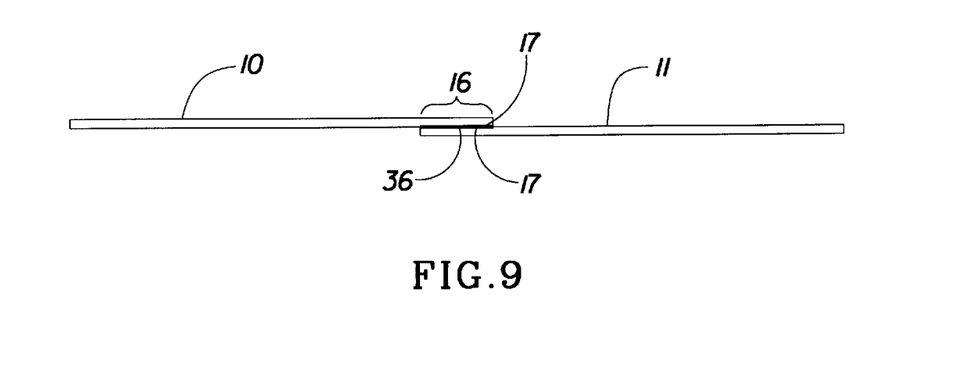
FIG. 9 is a front elevational view of the preferred embodiment of the web configuration during the first bonding process.

Referring to FIG. 9, the most preferable method for bonding the first web 10 and second web 11 may be accomplished by placing the inboard edge 17 of the first web 10 adjacent to the inboard edge 17 of the second web 11 so that the inboard edge 17 of the first web 10 forms an overlap 16 with the inboard edge 17 of the second web 11. The width of the overlap 16 between the first web 10 and second web 11 is less than the first width of the first web 10 and the second width of the second web 11.

Preferably a notched roll 13 or more preferably a bumpered roll 12 is provided. Preferably at least one of the two webs 10, 11 contacts the raised area 20 on the bumpered roll 12 or the area of reduced diameter 24 on the notched roll 13. A cutting device is juxtaposed with the roll. The first web 10 and the second web 11 are interposed between the roll and the cutting device. The inboard edge 17 of the first web 10 and second web 11 are severed.

The severed inboard edge 17 of the first web 10 forms a new overlap 16 with the severed inboard edge 17 of the second web 11. The two webs 10, 11 are bonded so as to form a bond 36 coincident with the width of the overlap 16 between the first web 10 and the second web 11.

EXAMPLE I

Referring to FIG. 1, FIG. 2 and FIG. 9, two webs 10, 11 of polyester film each 2 mils thick and 114 inches wide were placed on the unwind stand 31 of a web handling apparatus 30 manufactured by Webex Incorporated. The two webs 10, 11 were unwound simultaneously and the inboard edge 17 of each web overlapped with one another so as to create a 4 inch wide overlap 16. The two webs 10, 11 then contacted a bumpered 12 anvil roll 32. To create the bumpered roll 12, masking tape 33 was wrapped around the roll at the centerline 19 of an anvil roll 32 having a roll diameter of 6 inches and a longitudinal length of approximately 235 inches as shown in FIG.2. A 4 inch wide strip of masking tape 33 was used on each side of the anvil roll 32 centerline 19 in order to create an 8 inch wide bumper. The masking tape 33 was wrapped around one side of the anvil roll 32 adjacent to the centerline 19 so as to create approximately a 5 mil increase in the radius of the anvil roll 32 in that 4 inch wide area. On the opposite adjacent side of the anvil roll 32 centerline 19, enough masking tape 33 was wrapped around so as to create approximately a 10 mil increase in the radius of the anvil roll 32 in that 4 inch wide area.

The two webs 10, 11 were transferred to the bumpered 12 anvil roll 32. The inboard edge 17 of the first web 10 contacted and extended beyond the 4 inch wide area of masking tape 33 on one side of the centerline 19 wherein the radius of the anvil roll 32 had been increased by 5 mils. The inboard edge 17 of the second web 11 contacted and extended beyond the 4 inch wide area of masking tape 33 on the opposite adjacent side of the centerline 19 wherein the radius of the anvil roll 32 had been increased by 10 mils. The outboard edge 18 of the first web 10 and the outboard edge 18 of the second web 11 both contacted the anvil roll 32 at locations axially outside of the 8 inch wide bumpered 12 area. Contemporaneously, the two webs 10, 11 were slit at the overlap 16. As the first web 10 and the second web 11 were transferred from the bumpered 12 anvil roll 32, a new overlap 16 having a width of approximately 20 mils was formed between the severed inboard edge 17 of the first web 10 and the severed inboard edge 17 of the second web 11. The two webs 10, 11 were then ultrasonically bonded within the overlapped area to form a single unitary web. An ultrasonic welding device manufactured by Branson Ultrasonic Corporation was used for this purpose. The single unitary web was then rewound.

While particular embodiments of the present invention have been illustrated and described, it would be obvious to those skilled in the art that various changes and modifications can be made without departing from the scope and spirit of the invention. As examples, a bowed roll 14 or a crowned roll 15 may be bumpered 12, three rolls in a parallel common axial plane may have a center roll 23 that is both notched 13 and rotates at a faster speed than the outer 22 two rolls, etc.

What is claimed is:

1. A process for bonding webs, comprising the steps of:
   a) providing a first web having a first length, a first width, a first edge and a second edge;
   b) providing a second web having a second length, a second width, a first edge and a second edge;
   c) overlapping said first edge of said first web with said first edge of said second web thereby forming an overlap region wherein the width of said overlap is less than the first width of said first web and the second width of said second web;
   d) providing a roll having at least a first diameter and a second diameter wherein said first diameter is different than said second diameter;
   e) juxtaposing a cutting device with said roll;
   f) interposing said first web and said second web between said cutting device and said roll whereby at least one of said first web or said second web is displaced out of plane;
   g) severing said first web and said second web with said cutting device to provide a severed first edge of said first web and a severed first edge of said second web;
   h) overlapping said severed first edge of said first web with said severed first edge of said second web thereby forming a new overlap;

i) bonding said first web to said second web thereby forming a bond coincident with said overlap.

2. A process for bonding webs according to claim 1 wherein said roll further comprises providing said roll with a third diameter wherein said third diameter is adjacent to said first diameter and wherein said third diameter is less than said first diameter and greater than said second diameter.

3. A process for bonding webs according to claim 1 wherein said first diameter of said roll is greater than said second diameter.

4. A process for bonding webs according to claim 1 wherein said first diameter of said roll is less than said second diameter.

5. A process for bonding webs comprising the steps of:
    a) providing a first web having a first length, a first width, a first edge and a second edge;
    b) providing a second web having a second length, a second width, a first edge and a second edge;
    c) overlapping said first edge of said first web with said first edge of said second web thereby forming an overlap region wherein the width of said overlap is less than the first width of said first web and the second width of said second web;
    d) juxtaposing a cutting device with said web;
    e) interposing said first web and said second web between said cutting device so as to sever said first edge of said first web and said first edge of said second web;
    f) providing an axially rotatable roll having a first diameter and at least one other diameter wherein said first diameter is greater than each of said other diameters;
    g) bringing said roll into contact with said first web and said second web;
    h) overlapping said severed first edge of said first web with said severed first edge of said second web;
    i) bonding said first web to said second web thereby forming a bond coincident with said width of said overlap.

6. A process for bonding webs, comprising the steps of:
    a) providing a first web having a first length, a first width, a first edge and a second edge;
    b) providing a second web having a second length, a second width, a first edge and a second edge;
    c) overlapping said first edge of said first web with said second edge of said second web thereby forming an overlap region wherein the width of said overlap is less than the first width of said first web and the second width of said second web;
    d) juxtaposing a cutting device with said web;
    e) juxtaposing said first web and said second web with said cutting device so as to sever said first edge of said first web and said first edge of said second web;
    f) providing a first bowed roll which is axially rotatable having a curved stationary axis of curvature, wherein said radius of curvature is oriented concave downstream;
    g) bringing said roll into contact with said first web and said second web;
    h) overlapping said severed first edge of said first web with said severed first edge of said second web;
    i) bonding said first web to said second web thereby forming a bond coincident with said width of said overlap.

7. A process for bonding webs, comprising the steps of:
    a) providing a first web having a first length, a first width, a first edge and a second edge;
    b) providing a second web having a second length, a second width, a first edge and a second edge;
    c) overlapping said first edge of said first web with said second edge of said second web thereby forming an overlap region wherein the width of said overlap is less than the first width of said first web and the second width of said second web;
    d) juxtaposing a cutting device with said web;
    e) juxtaposing said first web and said second web with said cutting device so as to sever said first edge of said first web and said first edge of said second web;
    g) providing two outer rolls and one center roll wherein said rolls being disposed on a common axis parallel to the cross machine direction;
    h) rotating said center roll about its axis at a first velocity, rotating said outer rolls about their axis at a second velocity wherein said first velocity of said center roll is greater than said velocity of said outer rolls;
    i) bringing said first roll, said second roll, and said third roll into contact with said first web and said second web;
    j) overlapping said severed first edge of said first web with said severed first edge of said second web;
    k) bonding said first web to said second web thereby forming a bond coincident with said overlap.

8. A process for bonding webs, comprising the steps of:
    a) providing a first web having a first length, a first width, a first edge and a second edge;
    b) providing a second web having a second length, a second width, a first edge and a second edge;
    c) overlapping said first edge of said first web with said second edge of said second web thereby forming an overlap region wherein the width of said overlap is less than the first width of said first web and the second width of said second web;
    d) providing three parallel rolls, a center roll and two outer rolls, said outer rolls being disposed on a common axis, said center roll being displaced from said axis of said outer rolls;
    e) bringing said center roll, and said outer rolls into contact with said first web and said second web;
    f) juxtaposing a cutting device with said center roll;
    g) interposing said first web and said second web between said cutting device so as to sever said first edge of said first web and said first edge of said second web;
    h) overlapping said severed first edge of said first web with said severed first edge of said second web;
    i) bonding said first web to said second web thereby forming a bond coincident with said overlap.

9. The process according to claim 1 wherein said bonding step is carried out continuously throughout the length of said overlap.

10. The process according to claim 1 wherein said step of bonding said first web to said second web comprises the formation of said bond coincident with the midpoint of said width of said overlap.

11. The process of bonding said first web to said second web according to claim 1 whereby said bond is formed by applying an adhesive to said width of said overlap.

12. The process of bonding said first web to said second web according to claim 1 whereby said bond is formed by applying ultrasonic energy to said width of said overlap.

13. A process for bonding webs, comprising the steps of:
a) providing a length of a first web wherein said first web has a first surface and a first edge and a second edge wherein said first and second edges of said first web are parallel to said length of said first web;
b) providing a length of a second web wherein said second web has a second surface and a first edge and a second edge wherein said first and second edges of said second web are parallel to said length of said second web;
c) overlaying said first web over said second web in face to face relationship wherein said first edge of said first web contacts said second web to form a two ply thickness of said first web and said second web;
d) bonding said first web to said second web at said first edge of said first web so as to form a bond which is juxtaposed with said first edge of said first web;
e) separating said first web from said second web to leave said two ply thickness at said bond juxtaposed with said first edge of said first web and a single ply thickness of said first web or said second web adjacent said to bond;
f) bonding said first web to said second web a second time at said bond in a general direction having a vector component perpendicular to said plane of said first web or said second web.

14. The process according to claim 13 wherein said step of providing said bond leaves an unbonded region of said first web or said second web between said bond and said first edge of said first web or said second web.

15. The process according to claim 14 further comprising the step of trimming said unbonded portion of at least one of said first web and said second web from said first web or said second web respectively.

16. A process for bonding webs, comprising the steps of:
a) providing a length of a first web wherein said first web has a first surface, a first edge and a second edge wherein said first and second edges are parallel to said length of said first web;
b) providing a length of a second web wherein said second web has a second surface and a first edge and a second edge wherein said first and second edges are parallel to said length of said second web;
c) folding said first web and said second web about fold lines parallel to said respective first edges so as to provide a first web and a second web wherein each of said first web and said second web have two legs of unequal length whereby one of said legs is a short leg and the other of said legs is a long leg wherein said length of said legs is taken in a direction perpendicular to said fold;
d) bringing said short leg of said first web in contact with said short leg of said second web thereby disposing said short legs and at least a portion of said long legs in a common plane or in a parallel plane;
e) bonding said first web and said second web to form a bond having a principal direction generally parallel to said respective first edges;
f) applying tension to said first web and said second web in a direction generally perpendicular to said fold lines, thereby disposing said short legs of said first web and said second web and at least a portion of said long legs of said first web and said second web in a common plane, said portions of said long legs of said first web and said second web being adjacent said respective short legs of said first web and said second web;
g) bonding said first and second web together a second time at said bond and in a general direction having a vector component perpendicular to said common plane of said first web and said second web.

* * * * *

UNITED STATES PATENT AND TRADEMARK OFFICE
CERTIFICATE OF CORRECTION

PATENT NO. : 5,827,384
DATED : October 27, 1998
INVENTOR(S) : David Lee Canfield et al.

It is certified that error appears in the above-identified patent and that said Letters Patent is hereby corrected as shown below:

Column 4, line 41, delete "18".

Signed and Sealed this

Fourth Day of May, 1999

Attest:

Attesting Officer

Q. TODD DICKINSON

Acting Commissioner of Patents and Trademarks